US010249261B2

(12) United States Patent
Song et al.

(10) Patent No.: US 10,249,261 B2
(45) Date of Patent: Apr. 2, 2019

(54) DISPLAY CONTROLLER AND APPLICATION PROCESSOR INCLUDING THE SAME

(71) Applicant: SAMSUNG ELECTRONICS CO., LTD., Suwon-si, Gyeonggi-do (KR)

(72) Inventors: Byoung-Ju Song, Gwangju (KR); Deok Soo Park, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 55 days.

(21) Appl. No.: 15/402,458

(22) Filed: Jan. 10, 2017

(65) Prior Publication Data

US 2017/0206856 A1 Jul. 20, 2017

(30) Foreign Application Priority Data

Jan. 14, 2016 (KR) ........................ 10-2016-0004963

(51) Int. Cl.

*G09G 5/06* (2006.01)
*G09G 5/10* (2006.01)
*H04N 1/60* (2006.01)

(52) U.S. Cl.

CPC ................. *G09G 5/06* (2013.01); *G09G 5/10* (2013.01); *G09G 2320/0626* (2013.01); *G09G 2320/0673* (2013.01)

(58) Field of Classification Search

USPC .......................................................... 345/601
See application file for complete search history.

(56) References Cited

U.S. PATENT DOCUMENTS

| | | | | |
|---|---|---|---|---|
| 6,288,745 | B1 * | 9/2001 | Okuno | G06T 3/4007 348/441 |
| 7,190,396 | B2 | 3/2007 | Sasaki | |
| 7,649,507 | B2 | 1/2010 | Joo | |
| 8,089,490 | B2 | 1/2012 | Omori | |
| 8,659,627 | B2 | 2/2014 | Mori | |
| 8,665,486 | B2 | 3/2014 | Aldrich et al. | |
| 8,791,879 | B2 | 7/2014 | Akimoto | |
| 8,830,256 | B2 | 9/2014 | Botzas et al. | |
| 9,106,877 | B2 | 8/2015 | Higashi | |
| 2002/0140652 | A1 * | 10/2002 | Suzuki | G09G 3/3611 345/87 |

(Continued)

*Primary Examiner* — Wesner Sajous

(74) *Attorney, Agent, or Firm* — F. Chau & Associates, LLC

(57) ABSTRACT

A display controller includes a lookup table configured to store a plurality of reference data and an interpolation circuit configured to calculate a corrected datum by performing correction on an image datum based on the plurality of reference data. The interpolation circuit determines whether the image datum is less than a reference value, calculates the corrected datum using a first interpolation method when the image datum is less than the reference value, and calculates the corrected datum using a second interpolation method different from the first interpolation method when the image datum is equal to or greater than the reference value. When the corrected datum is calculated using the first interpolation method, the interpolation circuit calculates the corrected datum based on a first reference datum, which corresponds to a product of the image datum and the reference value, among the plurality of reference data.

18 Claims, 10 Drawing Sheets

(56) References Cited

U.S. PATENT DOCUMENTS

| | | | | |
|---|---|---|---|---|
| 2008/0069479 | A1* | 3/2008 | Park | G09G 3/3648 382/300 |
| 2008/0174534 | A1* | 7/2008 | Park | G09G 3/3648 345/87 |
| 2011/0109652 | A1 | 5/2011 | Lee et al. | |
| 2011/0134164 | A1* | 6/2011 | Ko | G09G 5/06 345/690 |

* cited by examiner

FIG. 5

| IDATA | RDATA |
|---|---|
| 64 | 618 |
| 128 | 847 |
| 192 | 1019 |
| 256 | 1161 |
| ... | ... |
| 512 | 1591 |
| ... | ... |
| 1024 | 2181 |
| ... | ... |
| 1536 | 2623 |
| ... | ... |
| 2048 | 2989 |
| ... | ... |
| 2560 | 3308 |
| ... | ... |
| 3072 | 3593 |
| ... | ... |
| 3584 | 3854 |
| ... | ... |
| 4095 | 4095 |

DISPLAY CONTROLLER AND APPLICATION PROCESSOR INCLUDING THE SAME

CROSS-REFERENCE TO RELATED APPLICATION

This application claims priority under 35 U.S.C. § 119(a) to Korean Patent Application No. 10-2016-0004963, filed on Jan. 14, 2016 in the Korean Intellectual Property Office (KIPO), the disclosure of which is incorporated by reference herein in its entirety.

TECHNICAL FIELD

Exemplary embodiments of the inventive concept relate to a display controller, and more particularly, to a display controller for performing gamma correction using the exponential characteristic of a gamma curve and an application processor including the display controller.

DISCUSSION OF RELATED ART

Human vision reacts non-linearly to brightness according to Weber's law (other senses like hearing also react non-linearly to stimuli). Accordingly, when the brightness of light is linearly recorded with a limited bit depth such as eight bits per channel, posterization occurs so that the changes in brightness do not appear smoothly. Rather, dark portions, to which human eyes become sensitive, appear to have discrete changes in brightness. Therefore, in order to provide optimal picture quality with limited bit depth, information needs to be coded non-linearly so that dark portions can be more minutely recorded. Coding information adaptively to account for the non-linearity of human vision is known as gamma correction.

As the size of image data processed in image sensors or display devices has increased, the size of a lookup table used for gamma correction has also increased. For instance, when the image data is "n" bits, the lookup table includes a total of $2^n$ entries.

In order to reduce the size of the lookup table, only reference data may be stored in the lookup table and gamma correction is performed using interpolation based on the reference data. However, as the size of image data has increased, error occurrence has also increased.

SUMMARY

According to an exemplary embodiment of the inventive concept, a display controller includes a lookup table configured to store a plurality of reference data and an interpolation circuit configured to calculate a corrected datum by performing correction on an image datum based on the plurality of reference data. The interpolation circuit may determine whether the image datum is less than a reference value, calculate the corrected datum using a first interpolation method when the image datum is less than the reference value, and calculate the corrected datum using a second interpolation method different from the first interpolation method when the image datum is greater than or equal to the reference value. When the corrected datum is calculated using the first interpolation method, the interpolation circuit may calculate the corrected datum based on a first reference datum, which corresponds to a product of the image datum and the reference value, among the plurality of reference data.

According to an exemplary embodiment of the inventive concept, an application processor includes a central processing unit, a random access memory (RAM) configured to store image data, and a display controller including a lookup table configured to store a plurality of reference data and an interpolation circuit configured to calculate a corrected datum by performing correction on an image datum based on the plurality of reference data. When the image datum is less than the reference value, the interpolation circuit may calculate the corrected datum using an exponential interpolation method based on a reference datum, which corresponds to a product of the image datum and a reference value, among the reference data. When the image datum is greater than or equal to the reference value, the interpolation circuit may calculate the corrected datum using a linear interpolation method.

According to an exemplary embodiment of the inventive concept, a gamma correction method includes receiving an image datum, the image datum having n bits, comparing the image datum to a reference value, which has a value of $2^m$, determining that the image datum is less than the reference value, receiving a reference datum, from among a plurality of reference data stored in a lookup table, that corresponds to a product of the image datum and the reference value, and calculating a corrected datum using the reference datum and the exponential characteristic of a gamma curve having a gamma value. "n" is an integer greater than or equal to 2 and "m" is a natural number less than "n".

BRIEF DESCRIPTION OF THE DRAWINGS

The above and other features of the inventive concept will become more apparent by describing in detail exemplary embodiments thereof with reference to the attached drawings.

FIG. 5 is a table showing correction data stored in a lookup table according to an exemplary embodiment of the inventive concept.

DETAILED DESCRIPTION OF THE EMBODIMENTS

Exemplary embodiments of the inventive concept provide for a display controller configured with a gamma correction method that may reduce lookup table size and reduce errors.

Hereinafter, image data IDATA may include a still image, a moving image, or a stereoscopic image.

Figure 1:
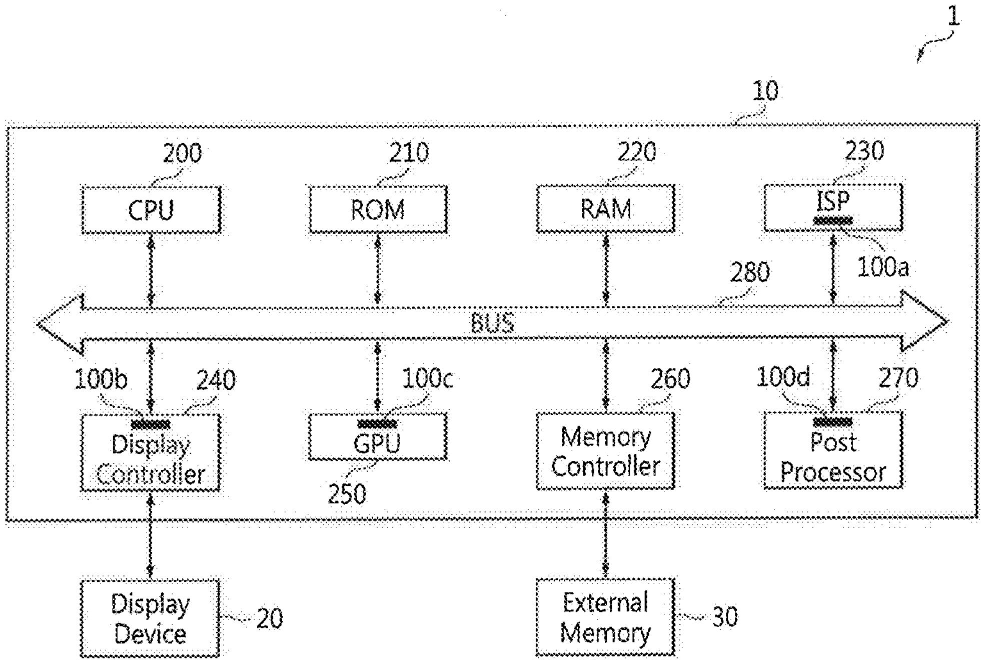
FIG. 1 is a block diagram of an electronic system according to an exemplary embodiment of the inventive concept.

FIG. 1 is a block diagram of an electronic system 1 according to an exemplary embodiment of the inventive concept. Referring to FIG. 1, the electronic system 1 may be implemented as a portable electronic device. The portable electronic device may be a laptop computer, a cellular/mobile phone, a smart phone, a tablet personal computer (PC), a personal digital assistant (PDA), an enterprise digital assistant (EDA), a digital still camera, a digital video camera, a portable multimedia player (PMP), a mobile internet device (MID), a wearable computer, an internet of things (IoT) device, an internet of everything (IoE) device, a handheld device, a handheld computer, a mobile device, an automotive navigation system, an MP3 player, etc.

The electronic system 1 includes a semiconductor integrated circuit (IC) device 10, a display device 20, and an external memory 30. Each of the elements 10, 20, and 30 may be formed in separate chips, but the inventive concept is not restricted to the present exemplary embodiment, e.g., the elements 10, 20, and 30 may be formed in one chip. The electronic system 1 may also include another element such as a camera module according to exemplary embodiments of the inventive concept. The semiconductor IC device 10 may be implemented as a system-on-chip (SoC) or an application processor (AP). For ease of description, the semiconductor IC device 10 is referred to as an AP 10. The electronic system 1 may be able to display a still image signal (or a still image) or a moving image signal (or a moving image) on the display device 20.

The external memory 30 stores program instructions executed in the AP 10. The external memory 30 may also store image data used to display a still image or a moving image on the display device 20. The moving image is a sequence of different still images presented in a short period of time.

The external memory 30 may be volatile or non-volatile memory. The volatile memory may be dynamic random access memory (DRAM), static RAM (SRAM), thyristor RAM (T-RAM), zero capacitor RAM (Z-RAM), or twin transistor RAM (TTRAM). The non-volatile memory may be electrically erasable programmable read-only memory (EEPROM), flash memory, magnetic RAM (MRAM), phase-change RAM (PRAM), or resistive memory.

The AP 10 controls the external memory 30 and/or the display device 20. The AP 10 may be referred to as an IC, a processor, an application processor, a multimedia processor, or an integrated multimedia processor. The AP 10 may include a central processing circuit (CPU) 200, a read-only memory (ROM) 210, a random access memory (RAM) 220, an image signal processor (ISP) 230, a display controller 240, a graphics processing unit (GPU) 250, a memory controller 260, a post processor 270, and a system bus 280. The AP 10 may also include other elements in addition to the elements illustrated in FIG. 1.

The CPU 200, which may be referred to as a processor, may process or execute programs and/or data stored in the external memory 30. For instance, the CPU 200 may process or execute programs and/or data in response to an operating clock signal output from a clock signal module. The CPU 200 may be implemented as a multi-core processor. A multi-core processor is a single computing component with two or more independent actual processors (referred to as cores). Each of the processors/cores reads and executes program instructions.

The CPU 200 runs an operating system (OS). The OS may manage resources (such as memory and display) of the electronic system 1. The OS may distribute the resources to applications executed in the electronic system 1.

Programs and/or data stored in the ROM 210, the RAM 220, and/or the external memory 30 may be loaded to a memory in the CPU 200 when necessary. The ROM 210 may store permanent programs and/or data. The ROM 210 may be implemented as an erasable programmable ROM (EPROM) or EEPROM.

The RAM 220 may temporarily store programs, data, or instructions. The programs and/or data stored in the ROM 210 or the external memory 30 may be temporarily stored in the RAM 220 according to instructions from the CPU 200 or a booting code stored in the ROM 210. The RAM 220 may be implemented as a DRAM or SRAM.

The ISP 230 may perform various kinds of image signal processing. The ISP 230 may process image data received from an image sensor. For instance, the ISP 230 may perform shake correction and white balance on the image data received from the image sensor. The ISP 230 may also perform color correction in terms of brightness or contrast, color harmony, quantization, color conversion into a different color space, and so on. The ISP 230 may periodically store processed image data in the external memory 30 via the system bus 280. The ISP 230 may include a gamma correction circuit 100*a*.

The display controller 240 may control operation of the display device 20. The display controller 240 may include a gamma correction circuit 100*b*.

The GPU 250 may read and execute program instructions involved in graphics processing. For instance, the GPU 250 may process graphical figures at high speed. The GPU 250 may also convert data, read by the memory controller 260 from the external memory 30, into a signal suitable for the display device 20. Apart from the GPU 260, a graphics engine or a graphics accelerator may also be used for graphics processing. The GPU 250 may include a gamma correction circuit 100*c*.

The memory controller 260 interfaces with the external memory 30. The memory controller 260 controls overall operation of the external memory 30 and controls data exchange between a host and the external memory 30. For instance, the memory controller 260 may write data to or read data from the external memory 30 at the request of the host. Here, the host may be a master device such as the CPU 200, the GPU 250, or the display controller 240. The memory controller 260 may read image data from the external memory 30 and provide the image data to the display controller 240 in response to an image data request from the display controller 240.

The post processor 270 may perform post processing on an image or an image signal to make it suitable for an output device (e.g., the display device 20). For example, the post processor 270 may enlarge, reduce, or rotate an image to be suitable for output. The post processor 270 may store the post-processed image in the external memory 30 via the system bus 280 or may directly output the post-processed image to the display controller 240 on the fly. The post processor 270 may include a gamma correction circuit 100*d*.

Each of the gamma correction circuits 100*a* through 100*d* may correspond to a gamma correction circuit 100, which will be described below.

The elements 200, 210, 220, 230, 240, 250, 260, and 270 may communicate with one another via the system bus 280. In other words, the system bus 280 connects to each of the elements 200, 210, 220, 230, 240, 250, 260, and 270, functioning as a passage for data transmission between the elements. The system bus 280 may also function as a passage for transmission of a control signal between the elements.

The system bus 280 may include a data bus for transmitting data, an address bus for transmitting an address signal, and a control bus for transmitting a control signal. The system bus 280 may include a small-scale bus, e.g., an interconnector for data communication between predetermined elements. The system bus 280 may be implemented as an advanced extensible interface (AXI) bus, but the inventive concept is not restricted to this example.

Figure 2:
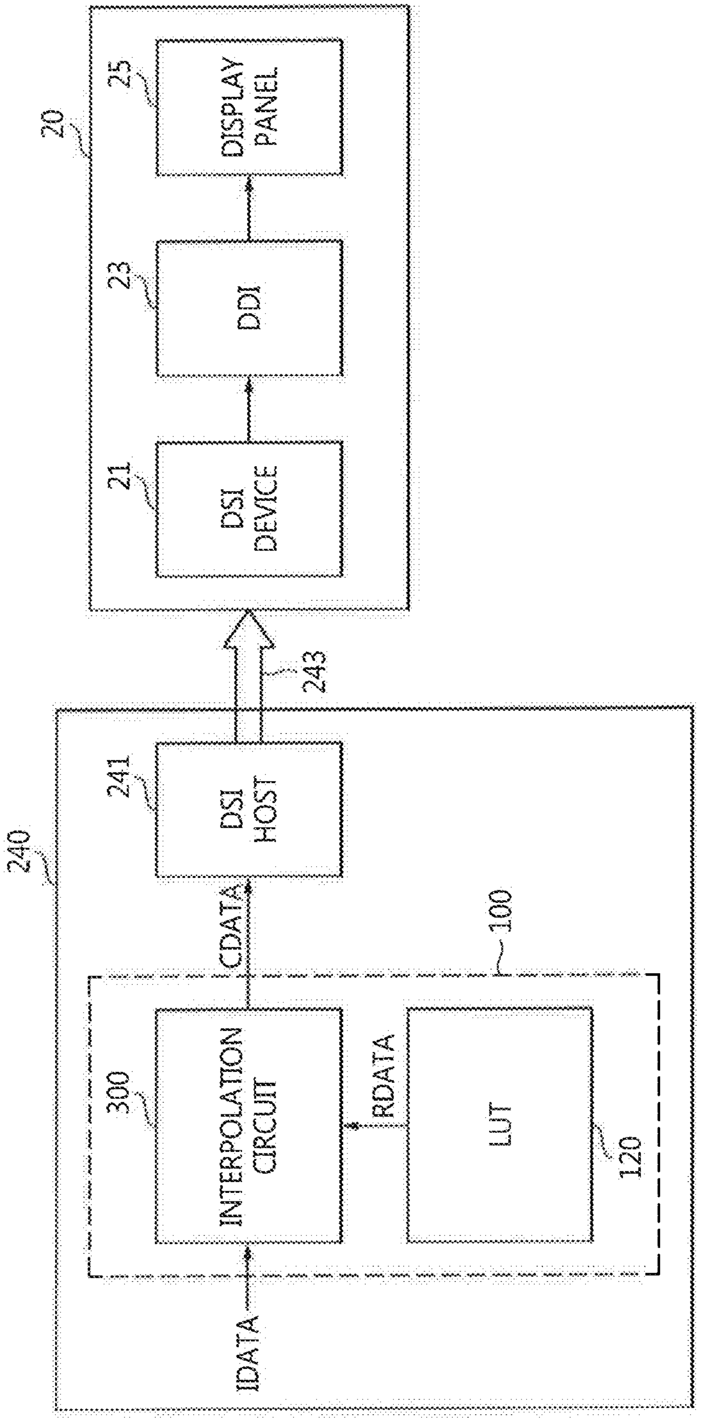
FIG. 2 is a block diagram of a display controller according to an exemplary embodiment of the inventive concept.

FIG. 2 is a block diagram of the display controller 240 according to an exemplary embodiment of the inventive concept. Referring to FIG. 2, the display controller 240 may include the gamma correction circuit 100 and a display serial interface (DSI) host 241.

The gamma correction circuit 100 may receive an image datum IDATA and may perform gamma correction on the image datum IDATA to generate a corrected datum CDATA. The gamma correction circuit 100 may output the corrected datum CDATA to the DSI host 241. The gamma correction circuit 100 may include a lookup table (LUT) 120 and an interpolation circuit 300.

The LUT 120 may store a plurality of reference data RDATA. When the image datum IDATA is N bits, the LUT 120 may store $2^N$ reference data RDATA. However, as described above, when the image datum IDATA is 12 bits, the LUT 120 may store $2^{12-M}$ reference data RDATA to prevent the size of the LUT 120 from being too large, where M is a natural number less than 12. For example, when M is 6, a reference value REF is $2^6$ or 64; as such, the LUT 120 may store 64 reference data RDATA, which will be described later in detail.

The interpolation circuit 300 may receive the image datum IDATA. The interpolation circuit 300 may generate the corrected datum CDATA by performing interpolation on the image datum IDATA based on the reference data RDATA stored in the LUT 120, and may output the corrected datum CDATA to the DSI host 241.

Although the LUT 120 is separate from the interpolation circuit 300 in the present exemplary embodiment illustrated in FIG. 2, the inventive concept is not restricted thereto. The LUT 120 may be designed together with the interpolation circuit 300 according to exemplary embodiments of the inventive concept.

An interface between the display controller 240 and the display device 20 may be a DSI 243. For serial communication using the DSI 243, the display controller 240 may include the DSI host 241 and the display device 20 may include a DSI device 21. The DSI host 241 may serialize the corrected datum CDATA, output from the gamma correction circuit 100, into a DSI datum and transmit the DSI datum to the display device 20.

The display device 20 may also include a display driver 23 and a display panel 25. The DSI device 21 may receive and deserialize display data (e.g., the DSI data) and output the deserialized display data to the display driver 23.

The AP 10 and the display driver 23 may be implemented in a single module, a single SoC, or a single package such as a multi-chip package. Alternatively, the display driver 23 and the display panel 25 may be implemented in a single module.

The display driver 23 controls operation of the display panel 25 according to the data from the DSI device 21. The display panel 25 may display an output image signal from the display driver 23. The display panel 25 may be implemented as a liquid crystal display (LCD) panel, a light emitting diode (LED) display panel, an organic LED (OLED) display panel, or an active-matrix OLED (AMOLED) display panel.

Figure 3A:
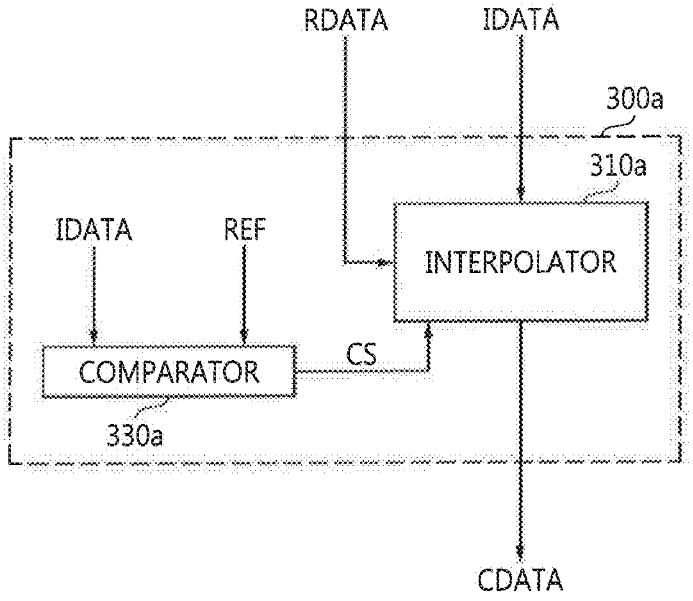
FIG. 3A is a conceptual block diagram of an interpolation circuit according to an exemplary embodiment of the inventive concept.

FIG. 3A is a conceptual block diagram of an interpolation circuit 300*a* according to an exemplary embodiment of the inventive concept. Referring to FIG. 3A, the interpolation circuit 300*a* may include an interpolator 310*a* and a comparator 330*a*.

The interpolator 310*a* may receive the image datum IDATA, calculate the corrected datum CDATA using either a first interpolation method or a second interpolation method based on the reference datum RDATA received from the LUT in response to a comparison signal CS, and output the corrected datum CDATA to the DSI host 241 illustrated in FIG. 2. The first interpolation method may be different from the second interpolation method.

The first interpolation method may be used when a value of the image datum IDATA is less than the reference value REF. The first interpolation method may be a method of calculating the corrected datum CDATA using an equation reflecting the exponential characteristic of a gamma curve.

The second interpolation method may be used when the value of the image datum IDATA is greater than or equal to the reference value REF. The second interpolation method may be a method of calculating the corrected datum CDATA using linear interpolation.

Figure 3B:
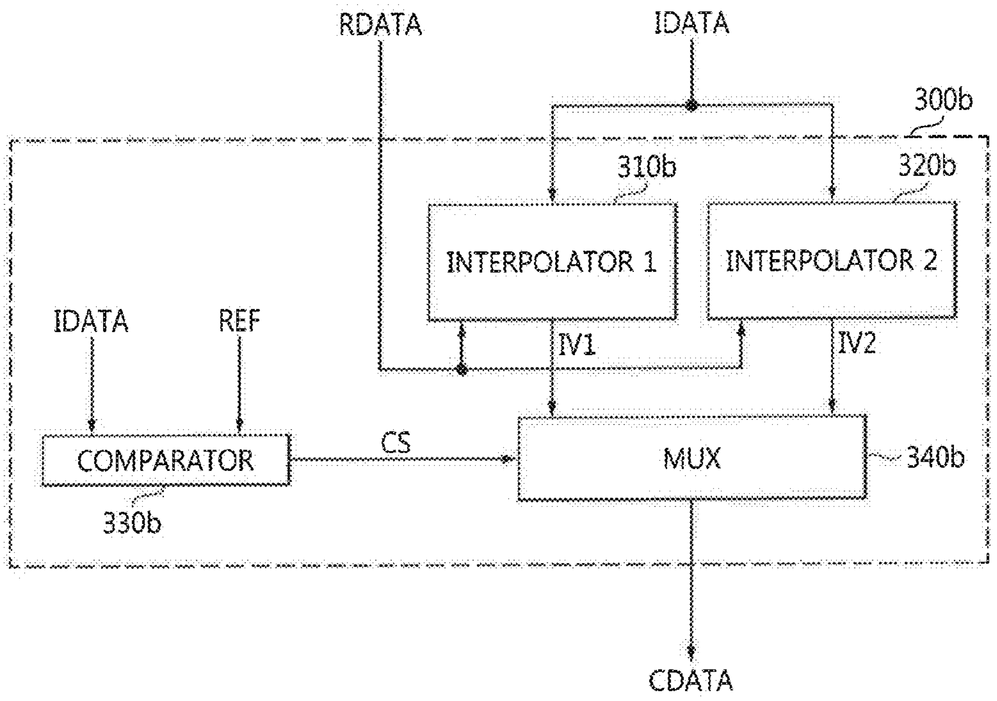
FIG. 3B is a conceptual block diagram of an interpolation circuit according to an exemplary embodiment of the inventive concept.

The comparator 330*a* may compare the image datum IDATA with the reference value REF and output the comparison signal CS to the interpolator 310*a*. The reference value REF may have been predetermined and stored in memory during device design. In other words, the reference value REF may be preset. However, the inventive concept is not restricted to this example. Alternatively, the reference value REF may be programmed For instance, when the image datum IDATA is 12 bits and the number of reference data RDATA is $2^6$ (or 64), the reference value REF may be $2^6$ (or 64). Consequently, the product of the number of reference data RDATA (e.g., $2^6$) and the reference value REF (e.g., $2^6$) is the same as the number of values (e.g., $2^{12}$) that can be expressed by the image data IDATA. The reference value REF may be set in this manner FIG. 3B is a conceptual block diagram of an interpolation circuit 300*b* according to an exemplary embodiment of the inventive concept. Referring to FIG. 3B, the interpolation circuit 300*b* may include a first interpolator 310*b*, a second interpolator 320*b*, a comparator 330*b*, and a multiplexer (MUX) 340*b*.

The first interpolator 310*b* may receive the image datum IDATA and may output a first interpolated value IV1 to the MUX 340*b* using a first interpolation method based on the reference data RDATA received from the LUT. The second interpolator 320*b* may receive the image datum IDATA and may output a second interpolated value IV2 to the MUX 340*b* using a second interpolation method based on the reference data RDATA received from the LUT. The comparator 330*b* may compare the image datum IDATA with the reference value REF and output the comparison signal CS to the MUX 340*b*.

As described above, the reference value REF may be predetermined and stored in memory during device design, or the reference value REF may be programmed The MUX 340*b* may select and output either the first interpolated value IV1 or the second interpolated value IV2 as the corrected datum CDATA to the DSI host 241 illustrated in FIG. 2, based on the comparison signal CS.

Figure 4:
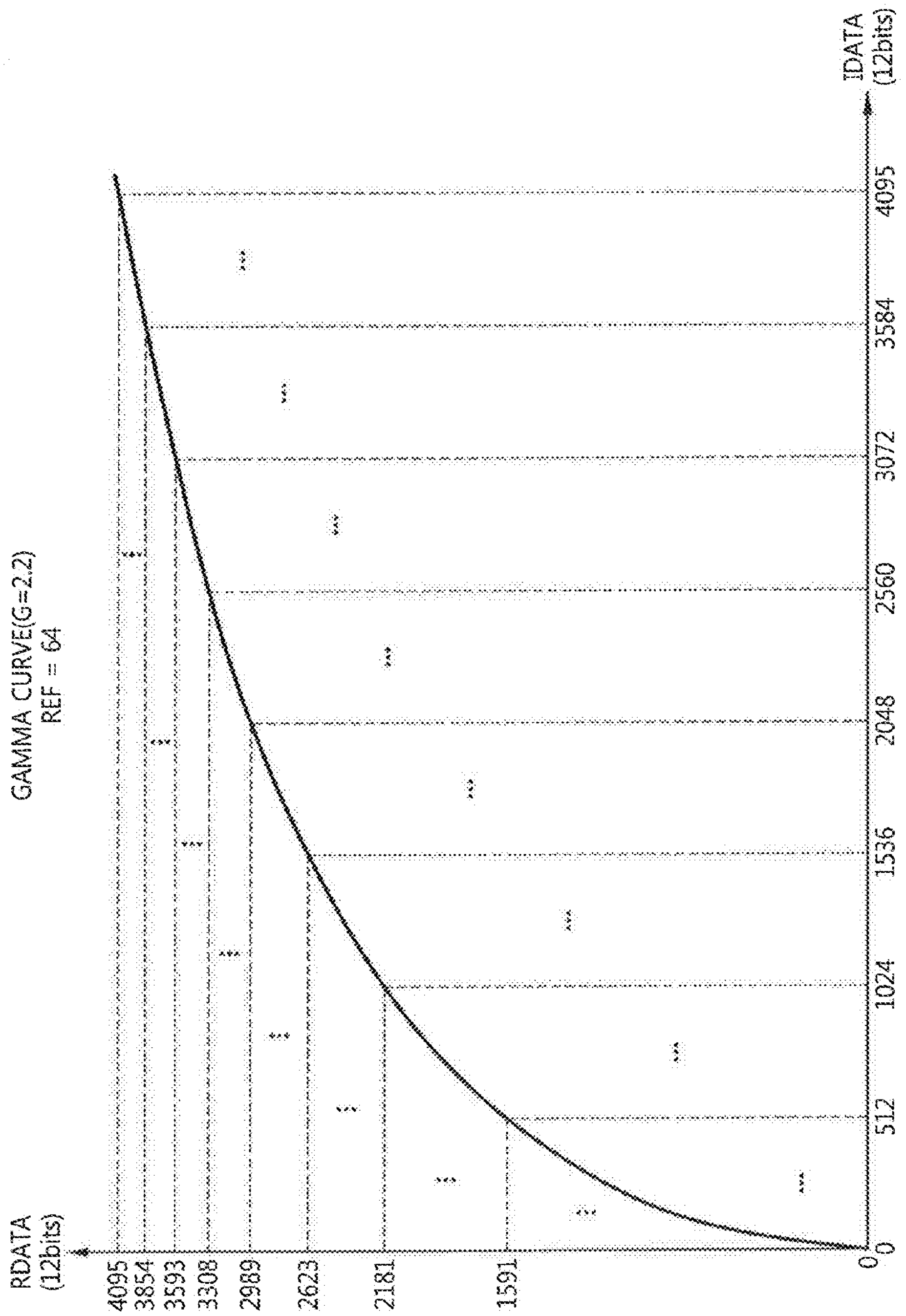
FIG. 4 is a graph showing the relationship between image data and correction data according to an exemplary embodiment of the inventive concept.

FIG. 4 is a graph showing the relationship between image data IDATA and correction data, e.g., the reference data RDATA, according to an exemplary embodiment of the inventive concept. The curve shown in FIG. 4 is a gamma curve. As described above, the gamma curve is used to prevent image distortion which occurs because human vision reacts to brightness non-linearly. The characteristic of the gamma curve varies with a gamma value G. FIG. 4 shows the gamma curve when the gamma value G is 2.2.

A normal gamma curve is expressed as Equation 1:

$$y=x^{1/G}, \quad (1)$$

where "y" is the vertical axis of the graph, "x" is the horizontal axis of the graph, and G is the gamma value.

The gamma value G may vary with an OS or a type of display device. For instance, the gamma value G may be set to 1.8 for the MAC OS of APPLE and to 2.2 for the WINDOWS OS of MICROSOFT. However, the inventive concept is not restricted to these examples.

Like the reference value REF, the gamma value G may be predetermined and stored in memory during device design. In other words, the gamma value G may be preset. However, the inventive concept is not restricted to this example.

It is assumed below that the reference value REF is $2^6$ (or 64) and each image datum IDATA and each reference datum RDATA are 12 bits. In the present exemplary embodiment, the number of reference data RDATA is 64, but only eight reference data RDATA are illustrated for ease of description.

Referring to FIG. 4, the horizontal axis may indicate values expressed by the image data IDATA. The vertical axis may indicate values expressed by the reference data RDATA.

Each of the reference data RDATA may be a value obtained when the image datum IDATA is applied to the gamma curve, e.g., Equation 1. For instance, the reference datum RDATA, corresponding to the image datum IDATA of 512, may be 1591 and the reference datum RDATA, corresponding to the image datum IDATA of 1024, may be 2181, but the inventive concept is not restricted to the present exemplary embodiment.

In other words, the reference data RDATA stored in the LUT 120 may vary with the gamma value G and the value of the image datum IDATA. The reference data RDATA may be predetermined and stored in memory during device design. For instance, when the image datum IDATA is 12 bits and the number of reference data RDATA is $2^6$ (or 64), the reference value REF may be $2^6$ (or 64). Consequently, the product of the number of reference data RDATA and the reference value REF is the same as the number of values (e.g., $2^{12}$) that can be expressed by the image data IDATA. Alternatively, the reference value REF and the reference data RDATA may be programmed FIG. 5 is a table showing the reference data RDATA stored in the LUT 120 according to an exemplary embodiment of the inventive concept. Referring to FIG. 5, the LUT 120 may store a plurality of the reference data RDATA corresponding to values of the image data IDATA.

When the LUT 120 stores the reference data RDATA corresponding to all values of the image data IDATA, the size of the LUT 120 is too large. Therefore, as shown in FIG. 5, the LUT 120 may store the reference data RDATA corresponding to values of the image data IDATA which appear at intervals of the reference value REF. For instance, when the reference value REF is 64, the LUT 120 may store the reference data RDATA corresponding to values 64, 128, . . . , and 4095 of the image data IDATA. In this example, the LUT 120 may store a total of 64 reference data RDATA.

According to exemplary embodiments of the inventive concept, the LUT 120 may also include a reference datum RDATA of 0 corresponding to a value of 0 of the image data IDATA.

Figure 6:
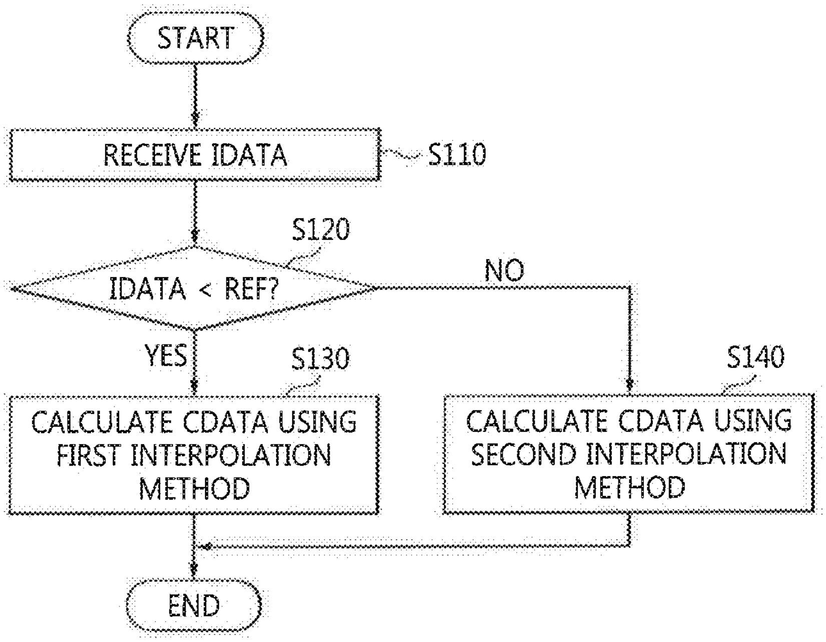
FIG. 6 is a flowchart of a gamma correction method of a gamma correction circuit according to an exemplary embodiment of the inventive concept.

FIG. 6 is a flowchart of a gamma correction method of the gamma correction circuit 100 according to an exemplary embodiment of the inventive concept. Referring to FIG. 6, the gamma correction circuit 100 may receive an image datum IDATA in operation S110. The gamma correction circuit 100 may determine whether a value of the image datum IDATA is less than the reference value REF in operation S120.

When it is determined that the value of the image datum IDATA is less than the reference value REF (e.g., YES) in operation S120, the gamma correction circuit 100 may calculate the corrected datum CDATA using a first interpolation method in operation S130. The first interpolation method may use an equation which reflects the exponential characteristic of a gamma curve.

When it is determined that the value of the image datum IDATA is greater than or equal to the reference value REF (e.g., NO) in operation S120, the gamma correction circuit 100 may calculate the corrected datum CDATA using a second interpolation method in operation S140. The second interpolation method may be a linear interpolation method.

Figure 7:
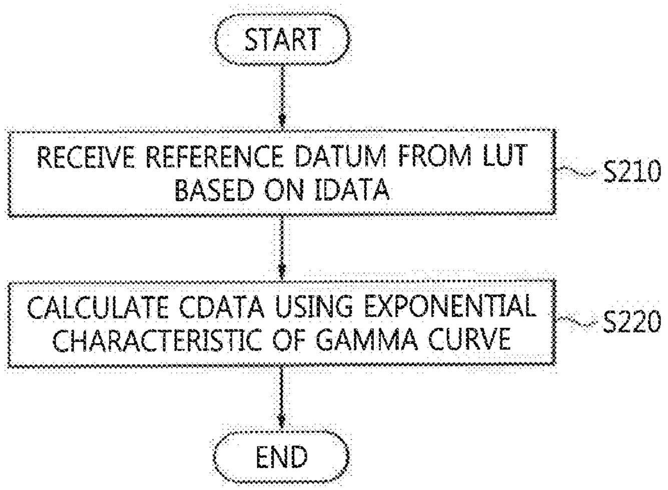
FIG. 7 is a flowchart of a first interpolation method of an interpolation circuit according to an exemplary embodiment of the inventive concept.

FIG. 7 is a flowchart of a first interpolation method of the interpolation circuit 300 according to an exemplary embodiment of the inventive concept. Referring to FIG. 7, the interpolation circuit 300 may receive a reference datum RDATA from the LUT 120 based on the image datum IDATA in operation S210.

Referring to FIGS. 2, 5, and 7, the interpolation circuit 300 may receive, from the LUT 120, the reference datum RDATA that corresponds to the product of the image datum IDATA and the reference value REF. For instance, when the image datum IDATA is a 12-bit datum "000000000001", e.g., the value of the image datum IDATA is 1, and the reference value REF is 64, the product is 64. As such, the interpolation circuit 300 may receive the reference datum RDATA of 618, which corresponds to 64.

The interpolation circuit 300 may calculate the corrected datum CDATA using the exponential characteristic of a gamma curve in operation S220. The interpolation circuit 300 may calculate the corrected datum CDATA using Equation 2 which reflects the exponential characteristic of a gamma curve:

$$CDATA = \frac{RDATA}{REF^{1/G}}, \quad (2)$$

In Equation 2, RDATA is the reference datum, REF is the reference value, and G is the gamma value.

For instance, when the reference value REF is 64 and the gamma value G is 2.2, the denominator may be 6.622. The denominator may be calculated or may be a value that has been stored in memory.

Consequently, the interpolation circuit 300 may calculate the corrected datum CDATA by applying the values to Equation 2, according to the first interpolation method. For example, when the image datum IDATA is 1, the reference datum RDATA is 618 and thus, the corrected datum CDATA is calculated to be 93.

Figure 8:
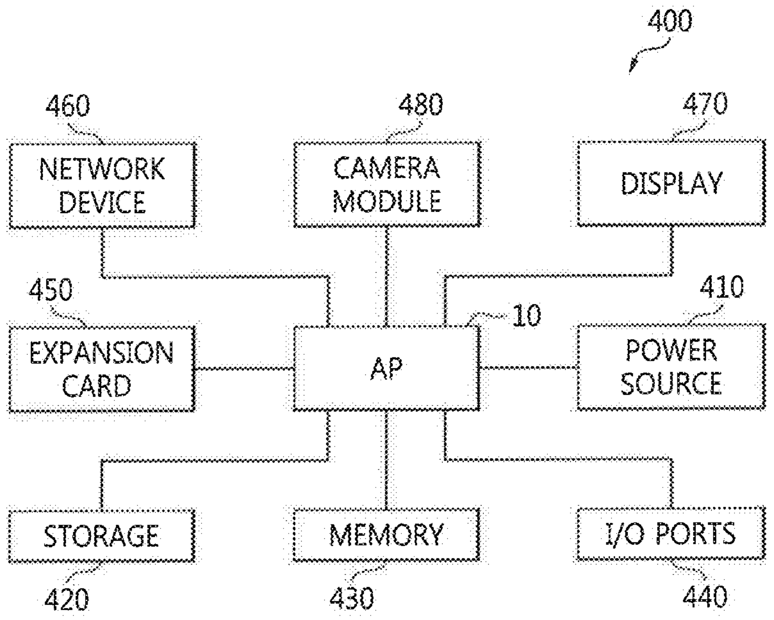
FIG. 8 is a block diagram of an electronic system according to an exemplary embodiment of the inventive concept.

FIG. 8 is a block diagram of an electronic system 400 according to an exemplary embodiment of the inventive concept.

Referring to FIG. 8, the electronic system 400 may be embodied as personal computer (PC), a data server, a laptop computer, or a portable device. The portable device may be a mobile phone, a smart phone, a tablet PC, a personal digital assistant (PDA), an enterprise digital assistant (EDA), a digital still camera, a digital video camera, a portable multimedia player (PMP), a personal navigation device or a portable navigation device (PDN), a handheld game console, or an e-book.

The electronic system 400 includes an AP 10, a power source 410, a storage device 420, a memory 430, input/output (I/O) ports 440, an expansion card 450, a network device 460, and a display 470. According to an exemplary embodiment of the inventive concept, the electronic system 400 may further include a camera module 480.

The AP 10 may control an operation of at least one among the elements 410 to 480. The AP 10 corresponds to the AP 10 illustrated in FIGS. 1 and 2.

The power source 410 may supply an operating voltage to at least one among the elements 10 and 420 to 480.

The storage device 420 may be embodied as a hard disk drive or a solid state drive (SSD).

The memory 430 may be embodied as a volatile memory or a nonvolatile memory. According an exemplary embodiment of the inventive concept, a memory controller, which may control data access operations, e.g., a program operation, an erase operation, or a read operation, of the memory device 430, may be integrated or embedded in the AP 10. According to an exemplary embodiment of the inventive concept, the memory controller may be implemented between the AP 10 and the memory device 430.

The I/O ports 440 are ports configured to transmit data to the electronic system 400 or transmit data output from the electronic system 400 to an external device. For example, the I/O ports 440 may include a port configured to connect a pointing device such as a computer mouse to the electronic device 400, a port configured to connect a printer to the electronic device 400, a port configured to connect a universal serial bus (USB) drive to the electronic device 400, etc.

The expansion card 450 may be embodied as a secure digital (SD) card or a multimedia card (MMC). According to an exemplary embodiment of the inventive concept, the expansion card 450 may be a subscriber identification module (SIM) card or a universal subscriber identity module (USIM) card.

The network device 460 is a device configured to connect the electronic system 400 to a wired or wireless network.

The display 470 may display data output from the storage device 420, the memory 430, the I/O ports 440, the expansion card 450, or the network device 460.

The camera module 480 is a module configured to convert an optical image into an electrical image. Thus, the electrical image output from the camera module 480 may be stored in the storage device 420, the memory 430, or the expansion card 450. Also, the electrical image output from the camera module 480 may be displayed on the display 470.

Figure 9:
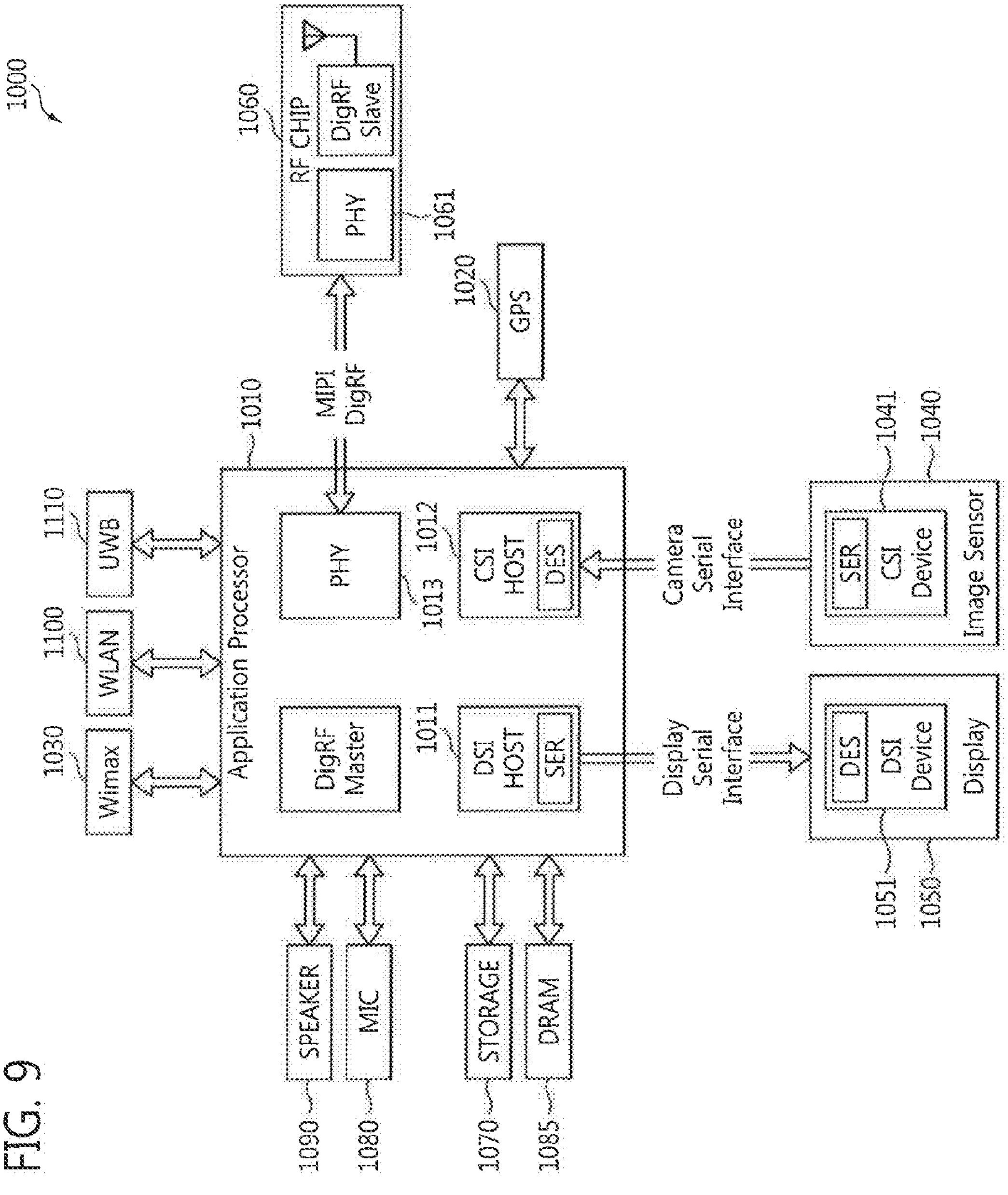
FIG. 9 illustrates an electronic system and an interface according to an exemplary embodiment of the inventive concept.

FIG. 9 illustrates an electronic system 1000 and an interface according to an exemplary embodiment of the inventive concept.

Referring to FIG. 9, the electronic system 1000 may be a data processing apparatus capable of using or supporting a MIPI interface, e.g., a mobile phone, a personal digital assistant (PDA), a portable multimedia player (PMP), an internet protocol television (IPTV), or a smart phone.

The electronic system 1000 includes an application processor 1010, an image sensor 1040, and a display unit 1050.

A camera serial interface (CSI) host 1012 included in the application processor 1010 may establish serial communication with a CSI device 1041 of the image sensor 1040 through a CSI. For example, an optical deserializer may be included in the CSI host 1012, and an optical serializer may be included in the CSI device 1041.

A display serial interface (DSI) host 1011 included in the application processor 1010 may establish serial communication with a DSI device 1051 of the display 1050 through a DSI. For example, an optical serializer may be included in the DSI host 1011 and an optical deserializer may be included in the DSI device 1051.

The electronic system 1000 may further include a radio-frequency (RF) chip 1060 for communicating with the application processor 1010. A physical layer PHY 1013 of the application processor 1010 and a physical layer PHY 1061 of the RF chip 1060 may exchange data with each other according to the MIPI DigRF standard.

The electronic system 1000 may further include a global positioning system (GPS) 1020, a storage unit 1070, a microphone 1080, a dynamic random access memory (DRAM) 1085, and a speaker 1090. The electronic system 1000 may establish communication using world-wide interoperability for microwave (Wimax) 1030, a wireless local area network (WLAN) 1100, an ultra-wide band (UWB) 1110, etc.

As described above, according to exemplary embodiments of the inventive concept, a display controller and an application processor may accurately and efficiently perform gamma correction despite using a small LUT, thereby reducing errors.

While the inventive concept has been shown and described with reference to exemplary embodiments thereof, it will be understood by those of ordinary skill in the art that various changes in form and detail may be made thereto without departing from the spirit and scope of the inventive concept as defined by the following claims.

What is claimed is:

1. A display controller comprising:

a lookup table configured to store a plurality of reference data; and an interpolation circuit configured to calculate a first corrected datum and a second corrected datum by performing correction on an image datum based on the plurality of reference data, wherein the interpolation circuit determines whether the image datum is less than a reference value, calculates the first corrected datum using a first interpolation method, calculates the second corrected datum using a second interpolation method different from the first interpolation method, outputs the first corrected datum when the image datum is less than the reference value, and outputs the second corrected datum when the image datum is greater than or equal to the reference value, when the first corrected datum is calculated using the first interpolation method, the interpolation circuit calculates the first corrected datum based on a first reference datum, which corresponds to a product of the image datum and the reference value, among the plurality of reference data, and wherein the interpolation circuit comprises:

a first interpolator configured to calculate the first corrected datum using the first interpolation method;

a second interpolator configured to calculate the second corrected datum using the second interpolation method;

a comparator configured to compare the image datum with the reference value and generate a comparison signal; and a multiplexer configured to select and output one of the first and second corrected datum based on the comparison signal.

2. The display controller of claim 1, wherein the first interpolator calculates the first corrected datum using $$CDATA = \frac{RDATA}{REF^{1/G}},$$

where CDATA is the first corrected datum, RDATA is the first reference datum, REF is the reference value, and G is a gamma value.

3. The display controller of claim 2, wherein the plurality of reference data stored in the lookup table are calculated from a gamma curve for which the gamma value is 2.2.

4. The display controller of claim 2, wherein the gamma value and the reference value are preset in memory, and are changeable.

5. The display controller of claim 1, wherein the lookup table is implemented in memory and the plurality of reference data stored in the lookup table vary with a gamma value.

6. The display controller of claim 1, wherein the second interpolation method is linear interpolation.

7. The display controller of claim 1, wherein when the image datum is an n-bit datum and the reference value is $2^m$, the lookup table stores $2^{(n-m)}$ reference data, "n" being an integer greater than or equal to 2 and "m" being a natural number less than "n".

8. The display controller of claim 7, wherein the lookup table further stores a second reference datum, among the plurality of reference data, corresponding to the image datum having a value of 0.

9. An application processor comprising:

a central processing unit;

a random access memory (RAM) configured to store image data; and a display controller comprising a lookup table configured to store a plurality of reference data and an interpolation circuit configured to calculate a corrected datum by performing correction on an image datum based on the plurality of reference data, wherein the interpolation circuit comprises a comparator configured to compare the image datum with the reference value and output a comparison signal, when the comparison signal indicates the image datum is less than a reference value, the interpolation circuit calculates a first corrected datum as the corrected datum using an exponential interpolation method based on a reference datum, which corresponds to a product of the image datum and the reference value, among the plurality of reference data, and outputs the first corrected datum, when the comparison signal indicates the image datum is greater than or equal to the reference value, the interpolation circuit calculates a second corrected datum as the corrected datum using a linear interpolation method, and outputs the second corrected datum.

10. The application processor of claim 9, wherein the interpolation circuit further comprises:

an interpolator configured to calculate the corrected datum by performing interpolation using an interpolation method, selected from among the exponential interpolation method and the linear interpolation method, and output one of the first and second corrected datum as the corrected datum based on the comparison signal.

11. The application processor of claim 9, wherein when the image datum is an n-bit datum and the reference value is $2^m$, the lookup table stores $2^{(n-m)}$ reference data, "n" being an integer greater than or equal to 2 and "m" being a natural number less than "n".

12. The application processor of claim 9, wherein when the interpolation circuit calculates the first corrected datum using the exponential interpolation method, the interpolation circuit calculates the first corrected datum using $$CDATA = \frac{RDATA}{REF^{1/G}},$$

where CDATA is the first corrected datum, RDATA is the reference datum, REF is the reference value, and G is a gamma value.

13. The application processor of claim 12, wherein the plurality of reference data stored in the lookup table are calculated from a gamma curve for which the gamma value is 2.2.

14. A gamma correction method, the method comprising:

receiving, by a comparator, an image datum, the image datum having n bits;

comparing, by the comparator, the image datum to a reference value, which has a value of $2^m$;

determining, by the comparator, whether the image datum is less than the reference value and generating a comparison signal;

receiving, by an interpolator, the image datum;

receiving, by the interpolator, a reference datum, from among a plurality of reference data stored in a lookup table, that corresponds to a product of the image datum and the reference value;

calculating, by the interpolator, a first corrected datum using the reference datum and an exponential characteristic of a gamma curve having a gamma value, in response to the comparison signal when the image datum is less than the reference value;

calculating, by the interpolator, a second corrected datum using a linear interpolation method, in response to the comparison signal when the image datum is greater than or equal to the reference value;

outputting, by the interpolator, one of the first and second corrected datum, in response to the comparison signal, wherein "n" is an integer greater than or equal to 2 and "m" is a natural number less than "n".

15. The gamma correction method of claim 14, wherein the number of reference data stored in the lookup table is $2^{(n-m)}$.

16. The gamma correction method of claim 14, wherein the lookup table stores a plurality of possible values for the product of the image datum and the reference value, each of the plurality of possible values corresponds to one of the plurality of reference data, and an interval between consecutive possible values is equal to the reference value.

17. The gamma correction method of claim 14, wherein the first corrected datum is calculated using $$CDATA = \frac{RDATA}{REF^{1/G}},$$

where CDATA is the first corrected datum, RDATA is the reference datum, REF is the reference value, and G is the gamma value.

18. The gamma correction method of claim 14, the method further comprising:

adjusting the gamma value based on operating system or display device type;

programming the plurality of reference data based on the gamma value; and programming the reference value.

* * * * *